United States Patent
Marino et al.

(10) Patent No.: US 9,440,721 B2
(45) Date of Patent: Sep. 13, 2016

(54) PADDLE FOR WATERCRAFT OR FLOTATION DEVICE

(71) Applicants: Michael Marino, Stuart, FL (US); Joseph Schorn, West Chester, PA (US)

(72) Inventors: Michael Marino, Stuart, FL (US); Joseph Schorn, West Chester, PA (US)

(*) Notice: Subject to any disclaimer, the term of this patent is extended or adjusted under 35 U.S.C. 154(b) by 46 days.

(21) Appl. No.: 14/594,086

(22) Filed: Jan. 10, 2015

(65) Prior Publication Data

US 2016/0200411 A1 Jul. 14, 2016

Related U.S. Application Data

(60) Provisional application No. 61/929,243, filed on Jan. 20, 2014.

(51) Int. Cl.
| | | |
|---|---|---|
| *B63H 16/04* | (2006.01) | |
| *B63H 16/10* | (2006.01) | |
| *B63B 35/79* | (2006.01) | |
| *F16B 7/10* | (2006.01) | |

(52) U.S. Cl.
CPC ............... *B63H 16/04* (2013.01); *B63B 35/79* (2013.01); *F16B 7/105* (2013.01); *B63H 2016/046* (2013.01)

(58) Field of Classification Search
CPC .............. B63H 16/04; B63H 2016/04; B63H 2016/046; B63B 35/79; F16B 7/105
USPC ................................................ 440/101, 102
See application file for complete search history.

(56) References Cited

U.S. PATENT DOCUMENTS

| | | | | | |
|---|---|---|---|---|---|
| 2,913,727 | A | * | 11/1959 | Smith ................... | B63H 16/04 416/72 |
| 3,092,855 | A | * | 6/1963 | Smith ................... | B63H 16/04 416/72 |
| 3,411,166 | A | * | 11/1968 | Kimmel ............... | B63B 27/146 182/196 |
| 4,673,361 | A | * | 6/1987 | Harvey ................. | B63H 16/04 416/72 |
| 5,114,371 | A | * | 5/1992 | Alonzo ................. | B63H 16/04 440/101 |
| 5,348,503 | A | * | 9/1994 | Fechtner .............. | A63B 31/11 440/101 |
| 5,364,296 | A | * | 11/1994 | Cerny ................... | B63H 16/04 416/74 |
| 5,851,132 | A | * | 12/1998 | Merrill ................. | B63H 16/04 416/74 |
| 6,261,141 | B1 | * | 7/2001 | Heap .................... | B63H 16/04 440/101 |
| 6,328,617 | B1 | * | 12/2001 | Gunnell ............... | B63H 16/04 416/70 R |
| 6,537,117 | B1 | | 3/2003 | Larson | |
| 8,100,733 | B1 | | 1/2012 | Ross et al. | |
| 8,317,558 | B2 | | 11/2012 | Bucknell et al. | |
| 8,337,372 | B1 | * | 12/2012 | Boterenbrood ......... | A01B 1/02 294/49 |
| 8,684,778 | B1 | * | 4/2014 | Bergman ............... | B63H 16/04 440/101 |

OTHER PUBLICATIONS

Race Hawaii Sales Brochure Powerglider Rotating Grips Sep. 24, 2013.

\* cited by examiner

*Primary Examiner* — Daniel V Venne

(57) ABSTRACT

A paddle for a watercraft or flotation device has a pair of shaft mounted blades connected by a core member. A right hand drive grip and a left hand drive grip are secured in spaced relation to opposite ends of the core. A right hand offset is mounted adjacent the right hand drive grip and a left hand offset is mounted adjacent the left hand drive grip for providing hand clearance for a user. The core is telescopically expandable and accommodates various size paddle shafts for propelling different watercraft.

15 Claims, 5 Drawing Sheets

PADDLE FOR WATERCRAFT OR FLOTATION DEVICE

RELATED APPLICATION

This application is based on and claims the benefit of Provisional Application No. 61/929,243 filed Jan. 20, 2014, the teachings of which are incorporated herein by reference.

BACKGROUND

There has been provided a paddle and improved grip for propelling a user on a flotation device. The paddle is adapted for use with a watercraft or flotation device such as a stand up paddleboard (SUP), a canoe, a kayak or the like.

In the sport of stand up paddleboarding, participants stand up on a surfboard like flotation device and propel themselves with a long handled single bladed paddle. When canoeing, users sit or kneel upright and use a traditional single bladed canoe paddle. In the sport of kayaking, users sit low in a boat and propel themselves using a double bladed paddle.

Two bladed paddles have been popular in kayaking for some time, because users can paddle on both sides of the boat. In the sport of stand up paddle boarding two bladed paddles have become popular as well. Two sided paddles allow a shorter cadence and more balanced paddle motion relative to a traditional one bladed paddle. This results in greater direction control and improved efficiency. Single side paddling results in a powerful concentrated stroke.

The exemplary embodiments feature a two bladed paddle which permits a participant in any of the aforementioned water sports to take advantage of the improved cadence and balanced paddle motion of a two bladed paddle while retaining the advantage of the powerful locomotive stroke which mimics the mechanics of a traditional single bladed paddle. The exemplary embodiments result in an arrangement where the positionment and orientation of the hands and paddle grips result in more consistent, efficient and powerful locomotive strokes with reduced wrist fatigue.

SUMMARY

There has been provided a paddle for a standup flotation device or board having a starboard side blade at one end and a port side blade at the other end. The blades are each mounted on a corresponding shaft, which are joined together by a core located between the blades. The core, adapted for use with various blade arrangements, is formed with a right hand drive grip and a left hand drive grip disposed in spaced relation along a central axis. The right hand drive grip is associated with the port blade and the left hand drive grip is associated with the starboard blade. A right hand offset is located on the core adjacent to the right hand drive grip and is offset from the central axis, and a left hand offset is located on the core adjacent to the left hand drive grip and is likewise offset from the central axis. The right hand offset has an inboard end extending from a point inboard of the right hand drive grip towards the starboard side paddle blade shaft stem at the right end of the core, and left hand offset extends from a point inboard of the left hand drive grip towards the port side paddle blade shaft stem at the left end of the core. The offsets provide hand clearance, and may take various forms such as a continuous semicircular tubular connection from the hand grip to the blade shaft, a segmented connection or an elongated connection. The offsets, hand grips and blades are mounted on the axis of the blade shaft. The hand grips and blades are disposed transverse to the blade shaft axis. The offsets are generally perpendicular to the parallel hand grips.

The user may use only the drive grips for propulsion, or if desired may also employ a left hand pivot grip and a right hand pivot grip, each located on the central axis inboard of the left hand drive grip and right hand drive grip along the central axis.

In exemplary embodiments, the various paddle components may be arranged in fixed positions relative to each other. The drive grips and blades may lie in non skewed parallel planes and the offsets may be perpendicular to the hand grips. In other embodiments the components may lie in various skew planes or surfaces having a common line including, for example, the paddle axis. The components, may be positioned relative to each other in fixed or adjustable positions. For example, the paddle may be arranged with the various components being adjustable so that the components may be easily assembled or disassembled for convenient transport and where the paddle length, the relative angular positioning of the handles and blades may be adjustably positioned with respect to each other to allow for changes depending on the particular application. Alternatively, the paddle may be a single unitary or integral structure with a fixed length, fixed handles and fixed paddle blades in a common arrangement.

In exemplary embodiments, a common core member may be employed with blades mounted on shaft members of various lengths, each length being selectable for a particular application. For example, a blade on a relatively long shaft may be mounted on the core for propelling a watercraft or flotation device such an SUP, while a shorter shaft may be useful for a kayak paddle application. A canoe or other flotation device may likewise employ a paddle shaft having a length tailored for such application. Thus, a common core member may be used with interchangeable paddle shafts and blades for different water sports.

DESCRIPTION OF EXEMPLARY EMBODIMENTS

Figure 1:
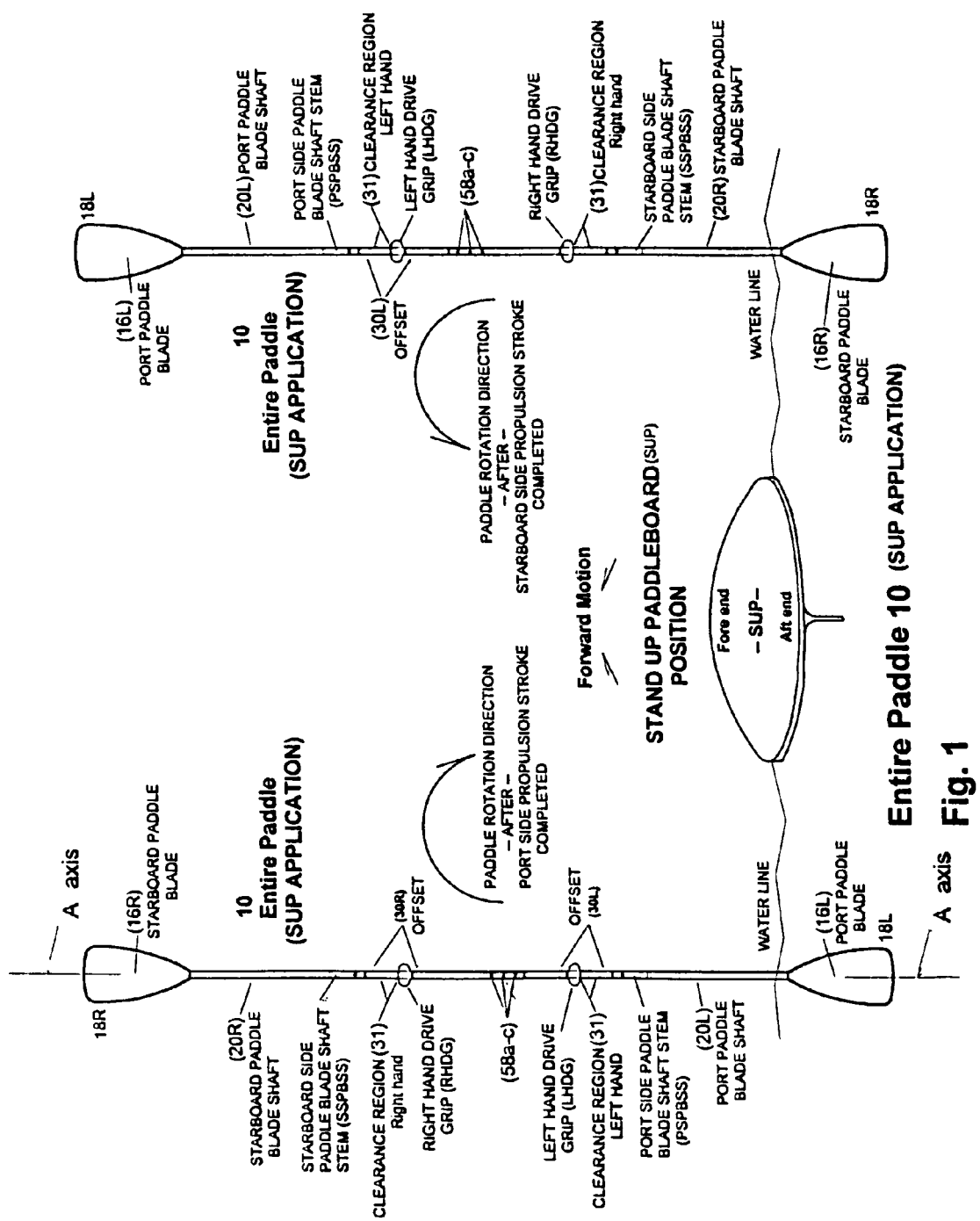
FIG. 1 illustrates a two bladed paddle depicted in use during respective port side and starboard side strokes performed by a user on a watercraft such as a standup paddleboard (SUP).

An exemplary embodiment of a hand held two bladed paddle 10 for propelling a stand up paddleboard (SUP) is depicted in FIGS. 1-5. In FIG. 1, the SUP is shown as viewed from the aft end towards the fore end. The starboard and port sides of the SUP are respectively designated by the legends shown. The depiction of the paddle 10 shown in use on the starboard side, has the starboard paddle blade 16R immersed in the water; and the paddle shown in use on the port side, has the port paddle blade 16L immersed in the water. It should be understood that the terms right R and left L as used herein are for reference only, and where convenient, the terms and designations R and L may be deleted when reference to direction is not necessary. The terms starboard and port are nautical terms for right and left respectively.

The two bladed paddle 10 has right hand blade 16R located at an outboard end 18R of a hollow right hand paddle shaft 20R; left hand blade 16L is located at an outboard end 18L of hollow left hand paddle shaft 20L; and a core 12 connects the right hand paddle shaft 20R and left hand paddle shaft. The blades, paddle shafts and core are aligned on a central axis A.

Figure 2:
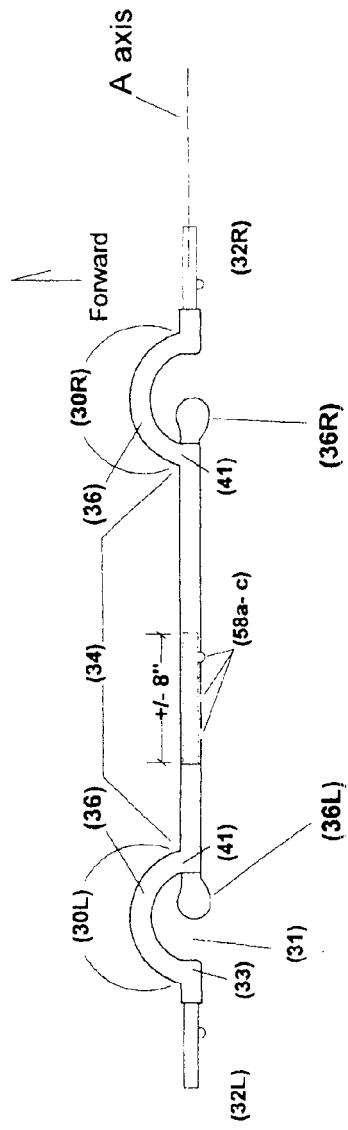
FIG. 2 is a top view of the core employing continuous semicircular offsets and drive grips.

As illustrated in FIG. 2, the core 12 is formed with a right hand outboard blade stem 32 R and a left hand outboard blade stem 32L; a right hand offset 30R and a left hand offset 30L connected to the respective blade stems, and a central portion or intermediate portion 34 located inboard of each offset. The offsets 30R-30L each have an open side 31, and are formed of a continuous semicircular portion 36 extending from blade shaft stem 32 to the ends 41 of the central portion 34 as shown.

Figure 1A:
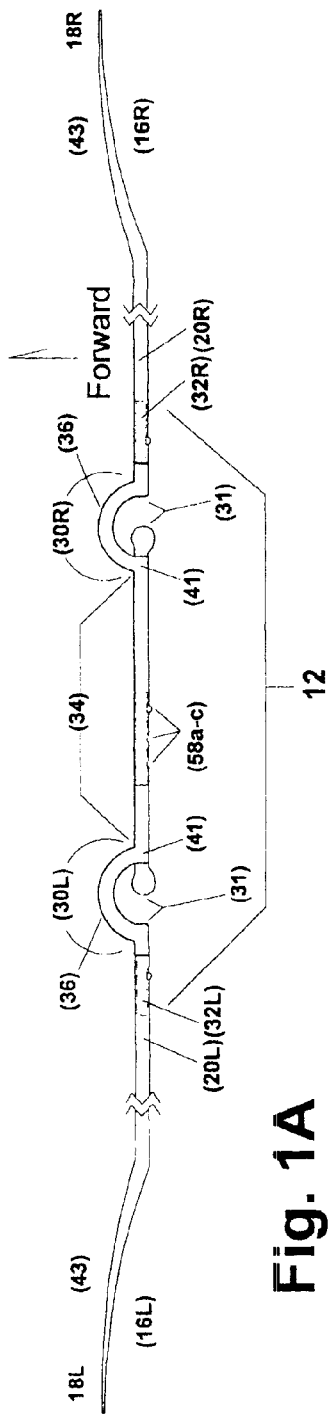
FIG. 1A is a top view of the paddle illustrated in FIG. 1.

The blades 16R-16L may lie in a common plane perpendicular to the offsets 30. The blades may have a curved portion causing the end of each blade to lie in a plane parallel to and spaced from the axis. In the exemplary embodiment illustrated in FIG. 1A, both the offsets 30R-30L may lie in the same plane. The blades 16R-16L may lie in the same or parallel planes perpendicular to the plane of the offsets. However, it should be understood that other skew orientations may be possible if desired.

As shown in FIG. 1, in use, the paddle is preferably held such that the offsets 30R-30L are oriented so that they extend away from the user in the fore direction of the board. The offsets 30R-30L may lie in a common plane and extend radially from the corresponding paddle shaft 20, generally perpendicular to back side 43 of the blade 16. Such an arrangement seems to provide a stabilized transfer of driving forces imparted to the blades. It should be understood that, if desired, it is possible to orient or skew the offsets so that they extend at a different angle relative to the plane of the blades.

Normally the offsets are open towards the user so that when paddling on the starboard side of the flotation device or SUP, the offsets 30 may be oriented so that their open sides 31 face the port side; and when paddling on the port side, the offsets 30 are oriented so that their open sides 31 face the starboard side. However, it is also possible to orient the offsets and blades differently if desired.

Figure 2A:
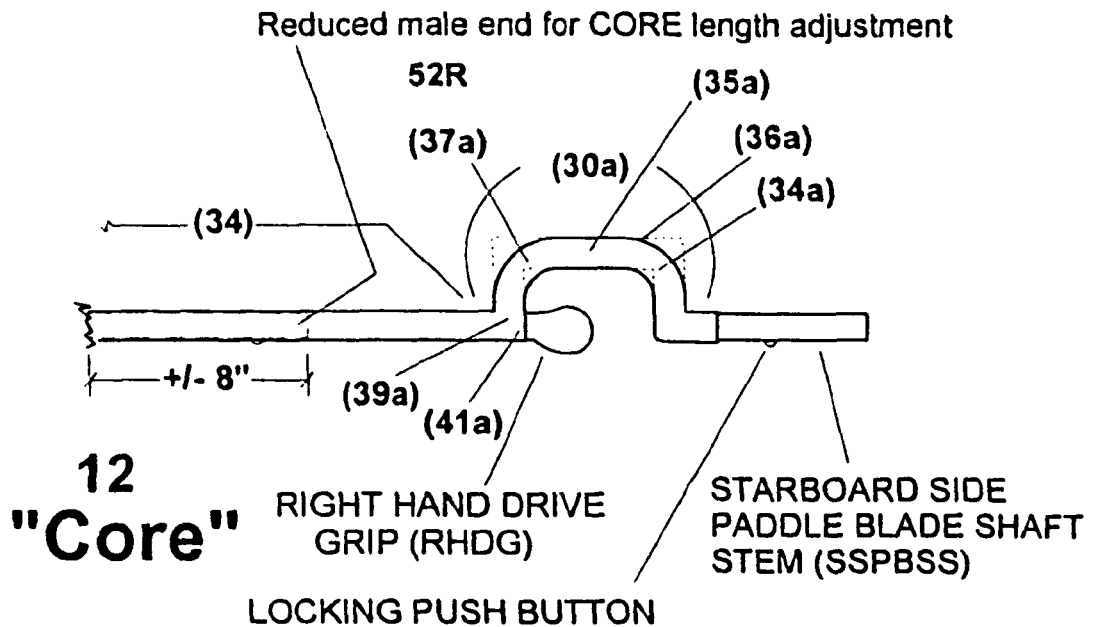
FIGS. 2A and 2B are illustrations of optional offsets including an elongated continuous offset and a segmented offset.
Figure 2B:
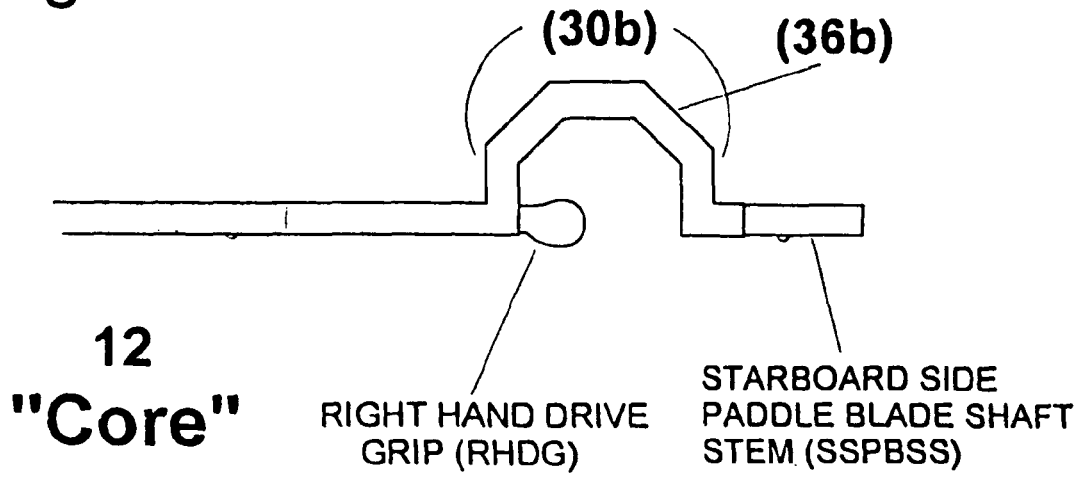

FIG. 2A and FIG. 2B show alternative exemplary embodiments of the offsets. In FIG. 2A the offset 30a is a continuous elongated tube 36a having an mitered outboard right angle elbow 34a, a straight portion 35a parallel with the axis A, and mitered inboard right angle elbow 37a joined to a second right angle elbow 39a at the inboard end 41a of the offset. Instead of miters connecting the elbow portions to the core, the offsets may be connected to the core by curved elbow end portions. In use, the offsets project in the fore direction away from the drive grips.

In FIG. 2B, offset 30b is formed of a segmented pipe 36b formed of interconnected straight portions 63 as shown. The segments form a continuous offset with appropriate hand clearance.

Figure 3:
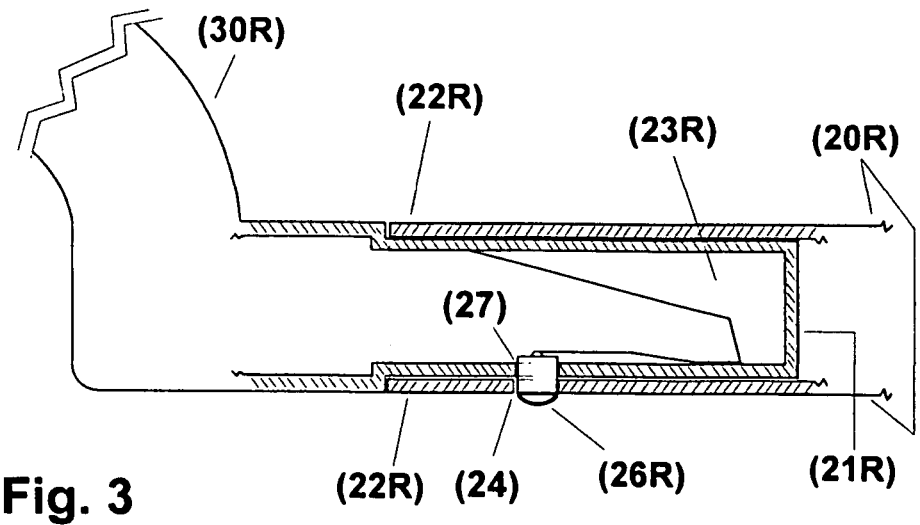
FIG. 3 is a fragmentary sectional drawing of the connection between the paddle blade shaft and the paddle blade shaft stem at a free end of the core.

As shown in FIG. 3, the right hand paddle shaft 20R has an inboard end 22R formed with a radial aperture 24. A right hand distal end 21R of the core 12 is formed with a reduced diameter portion 23R and has a spring loaded radially extending detent 26R which engages aperture 27. The reduced diameter portion 23R is sleeved into the inboard end 22R of the right hand paddle shaft 20R so that the apertures 24 and 27 are aligned. When so aligned, the spring loaded detent 26R slides into the apertures 24-27 to lock the right hand paddle shaft 20R securely to the core 12. In a similar way, the left hand blade and left hand paddle shaft are secured to the left hand distal end of the core 12.

Figure 4A:
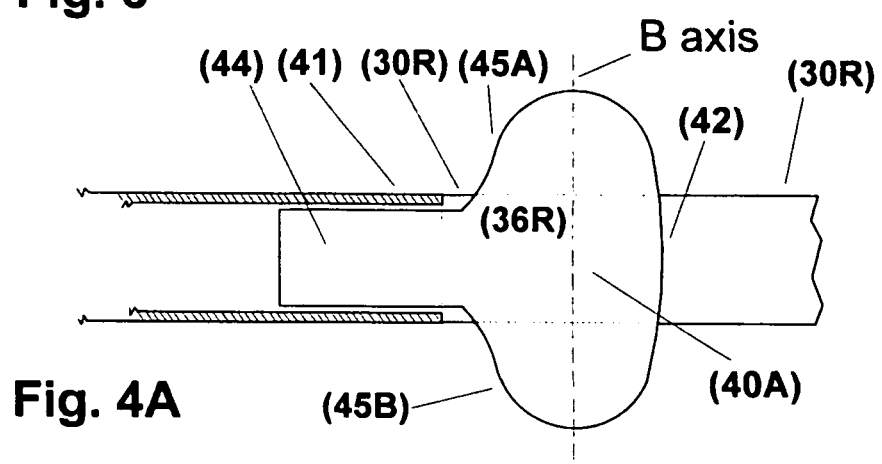
FIGS. 4A-4B are fragmentary rear and side sectional views showing details of the drive grip.
Figure 4B:
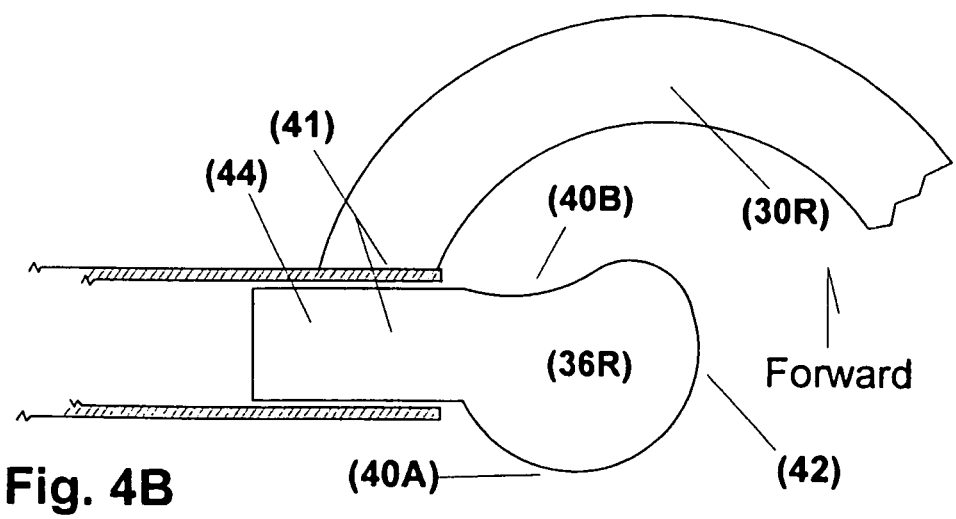

As shown in FIGS. 4A-4B, the paddle 10 has a right hand drive grip 36 R formed with an end 44 attached to inboard end 41 of right hand offset 30L. Left hand drive grip 30L is similarly secured at the in board end of left hand offset 30L. The right hand drive grip 36R has flattened opposite sides 40A-40B joined by a rounded top portion 42. The drive grip 36 has an inside curved edges 45A, 45B. The flattened sides 40A of the drive grips 36 are oriented on an axis B perpendicular to the plane in which the offsets lie and parallel to the plane or planes in which the blades 16 lie. The left hand drive grip 36L is similarly shaped. If desired, the orientation of the drive grips may lie skewed or twisted along the axis A with respect to the offsets 30 or the blades 16. The offsets provide hand clearance for the user.

Figure 5:
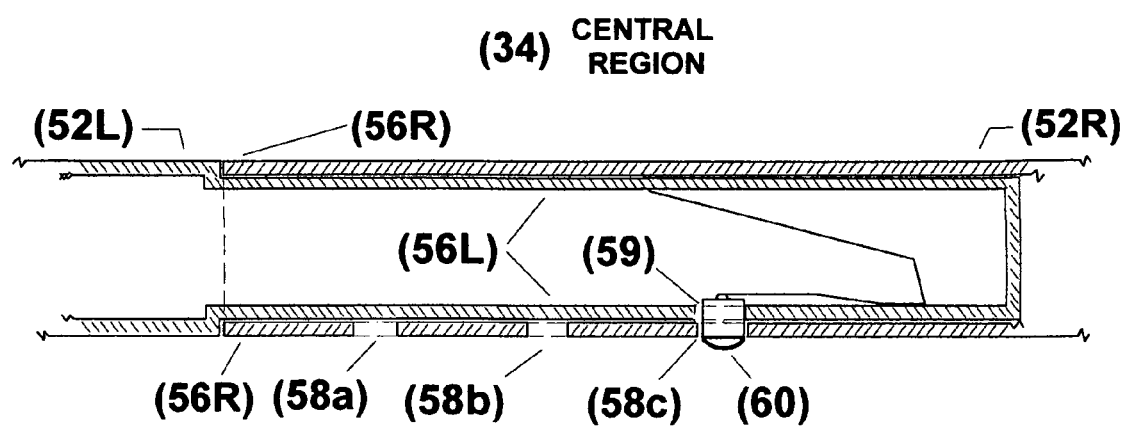
FIG. 5 is a fragmentary sectional illustration of a telescopic portion of the core.

Referring to FIGS. 2 and 5, the central region 34 of the core 12 may be formed of hollow tubing and is divided into right and left hand sections 52R and 52L as shown. Right and left hand sections 52R-52L have respective mating end portions 56R and 56L. The right end portion 56R is a section of hollow tubing formed with three radial apertures 58 a-c spaced apart along the tubing wall. The left end portion 56L is formed with an aperture 59 receiving a spring loaded radial detent 60 which selectively engages one of the radial apertures 58 a-c. The basic length of the paddle is at its minimum when the detent 60 is located in aperture 58c. The length of the paddle may be increased in increments as the sections 52R-52L are moved axially with respect to each other.

In the exemplary embodiment of a paddle for an SUP, the spacing of the apertures 58a-c is 2". Accordingly, the paddle length and thus the overall length of the paddle can be extended by 4" in 2" increments. In use the basic length of the paddle 10 is selected by the user to be about the height of the user plus 4". Accordingly, a six foot person, i.e., a person 6 feet (72") tall would select a paddle with a basic length of 78". Such a user would then have the option of extending the paddle length by 4" in 2" increments. This flexibility allows the user to change the paddle length for different applications or events. For example, the basic length might be suitable for rough waters, while a longer paddle may be suitable for calm or less active waters, or if a sporting event required a longer paddle. It should be understood that the basic length of the paddle 10 may be longer or shorter as desired, and the suggested increments or separation of the detents 56a-c may be longer or shorter as desired.

The user may engage the drive grips 36R and 36L with the corresponding right and left hand so that the palms of the user face each other. The drive or locomotive stroke on the port side comprises using the right hand to grip the right hand drive grip to drive the port side blade while pivoting the paddle with the left hand which holds the left hand drive grip. The drive stroke on the starboard side of the board uses the left hand drive grip to drive the right paddle blade while pivoting with the right hand.

If desired the user may optionally choose to grip the central portion of the core inboard of the offsets 30A, 30B along the axis a Right Hand Pivot Grip 72A and Left Hand Pivot Grip 72B. With such gripping action, if the user chooses to do so, the paddle may be pivoted about the wrist of the user as the other hand pushes the drive grip during the locomotive stroke.

It should also be understood that when a paddle for a kayak or canoe is required, shorter paddle shafts may be employed having lengths designed to optimize paddling at different heights above the water level. For example, the shaft length for a canoe paddle may be shortened to make the paddling stroke more comfortable and efficient for a user in the sitting or kneeling position. Likewise, a kayak paddle may use paddle shafts further shortened for such application for a user sitting at the waterline.

According to an exemplary arrangement, the user may employ only the drive grips to produce a locomotive force to drive the flotation device. In such an arrangement, the user grips the left hand drive grip with one hand and the right hand drive grip with the other. Paddling is accomplished using an outstretched motion where the right hand drives the port side blade in the water as the left hand pulls the left hand drive grip. The user then rotates the paddle to the starboard side holding the left hand drive grip to drive the starboard side blade.

The alternative arrangements allow the user to paddle different flotation devices using a single core as the support for different paddle blade arrangements. This permits the user to select the correct paddle shaft length to propel the watercraft optimally from whatever height is appropriate for the craft, i.e. longer for an SUP and shorter for a kayak or canoe.

Also, depending on the application, the relative angle between the drive grips and the paddle blades, or skew, may be adjusted. The drive grips may be skewed relative to the blades or the offsets or both. Skew may be controlled or adjusted using splined connections between the core and the paddle shafts.

The paddle is adapted to optimize the paddling force exerted by the user. The paddle has fixed grips which allow the user to predictively control the strokes at will. In this connection the efficiency and handling of the paddle may be adjusted by lengthening the paddle from the basic length to the longer length as desired. It can also be seen that the paddle 10 combines the advantage of a two bladed paddle with the power achievable with a traditional single bladed paddle.

The materials used to form the paddle may be light weight extruded aircraft aluminum tubes or carbon fiber composite materials to reduce swing weight.

The invention claimed is:

1. A paddle for a standup board comprising:
   a starboard side blade shaft having a distal end and proximal end, and a port side blade shaft having a distal end and proximal end;
   a starboard side blade secured to a distal end of the starboard side blade shaft, and a port side blade secured to a distal end of the port side blade shaft;
   a core having a right side end and a left side end, said core having a central region, said core for interconnecting the proximal end of the starboard side blade shaft to the proximal end of the port side blade shaft along a central axis;
   a right side blade and a left side blade, each said right side blade and left side blade extending along the central axis from the distal end of the starboard side blade shaft and the port side blade shaft respectively;
   a right hand drive grip secured to the a right side end of the core and a left hand drive grip secured to a left side end of the core, each being located in spaced relation in the central region along the central axis and oriented transverse thereto, the right hand drive grip being parallel to the port side blade and the left hand drive grip parallel to the starboard side blade;
   a right hand offset on the core adjacent to the right hand drive grip and offset from the central axis and a left hand offset on the core located adjacent to the left hand drive grip, said right hand offset extending from the core inboard of the right hand drive grip towards the right side end of the core, and said left hand offset extending from the core inboard of the left hand drive grip towards the left side end of the core; and;
   wherein the right hand offset and the left hand offset each have an open side along the central axis.

2. The paddle of claim 1 wherein when the paddle is disposed on the starboard side of the board, the offset has its open side oriented in the starboard direction and when the paddle is disposed on the port side of the board, the offset has its open side oriented in the port direction.

3. The paddle of claim 1 wherein the right hand offset and the left hand offset are disposed in a plane perpendicular to the blades including the central axis and extend radially thereof.

4. The paddle of claim 1 wherein the right hand drive grip and the left hand drive grip are fixed relative to the central axis.

5. The paddle of claim 1 wherein the right hand drive grip and left hand drive are parallel to flat sides of the blades.

6. The paddle of claim 1 wherein the blades and drive grips are selectively mounted in orthogonal planes relative to the offsets.

7. The paddle of claim 1 wherein the right hand drive grip and the left hand drive grip are each disposed in spaced relation with respect to the right hand offset and left hand offset respectively for providing clearance therebetween.

8. The paddle of claim 1 wherein the right hand offset and left offset are spaced from the right hand drive grip and left hand grips respectively for providing hand clearance.

9. The paddle of claim 1 further comprising: a right hand pivot grip and a left hand pivot grip located on the core in spaced relation along the central axis, each said right hand pivot grip and left hand pivot grip being oriented in alignment therewith, said right hand pivot grip and left hand pivot grip being located inboard of and adjacent to the right hand drive grip and left hand drive grip respectively.

10. The paddle according to claim 1 wherein the blades, the offsets and the drive grips are aligned in a plane on the central axis.

11. The paddle according to claim 1 wherein the blade shafts have a selectable length.

12. The paddle of claim 1 further comprising: a right hand pivot grip and a left hand pivot grip located in spaced relation on the central axis inboard of the right hand offset and the left hand offsets.

13. The paddle of claim 1 wherein the left hand blade and the right hand blade, the right hand offsets and left hand offset, and the right hand drive grip and left hand drive grip are adjustably mounted.

14. The paddle of claim 1 wherein the core, the left hand blades and the right hand blade, the right hand offset and left hand offset, and the right hand drive grip and left hand drive grip are fixedly mounted in a unitary integral structure.

15. A device for connecting paddle shafts of a two bladed paddle comprising:
- a core having a central axis, a right hand distal free end and a left hand distal free end;
- a right hand drive grip secured to a right hand distal free end of the core and a left hand drive grip secured to left hand distal free end of the core, each said right hand drive grip and left hand drive grip being located in spaced relation along a central axis and oriented transverse thereto;
- a right hand offset, a left hand offset and a central portion connecting the right hand offset and left hand offsets along the central axis, the right hand offset being mounted on the core adjacent to the right hand drive grip and the left hand offset being mounted on the core adjacent to the left hand drive grip, said right hand offset extending from the right side distal free end away from the central axis around the right hand drive grip and connected to the central portion, and said left hand offset extending from the port side distal free end away from the central axis around the left hand drive grip and connected to the central portion, and wherein the right hand offset and the left hand offset each have an open side.

* * * * *